May 23, 1939.  P. E. HAWKINS  2,159,022
UTILITY TRUCK
Filed Jan. 19, 1935   5 Sheets—Sheet 1
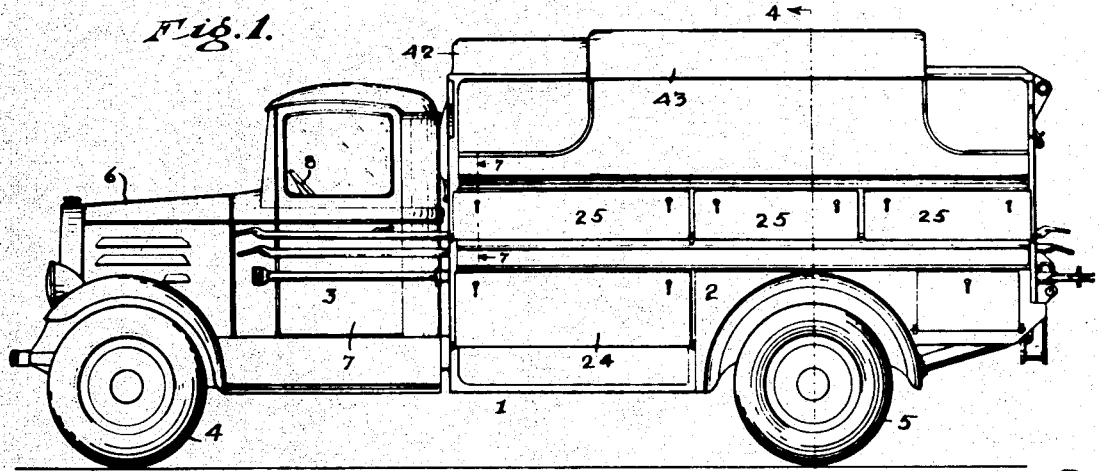
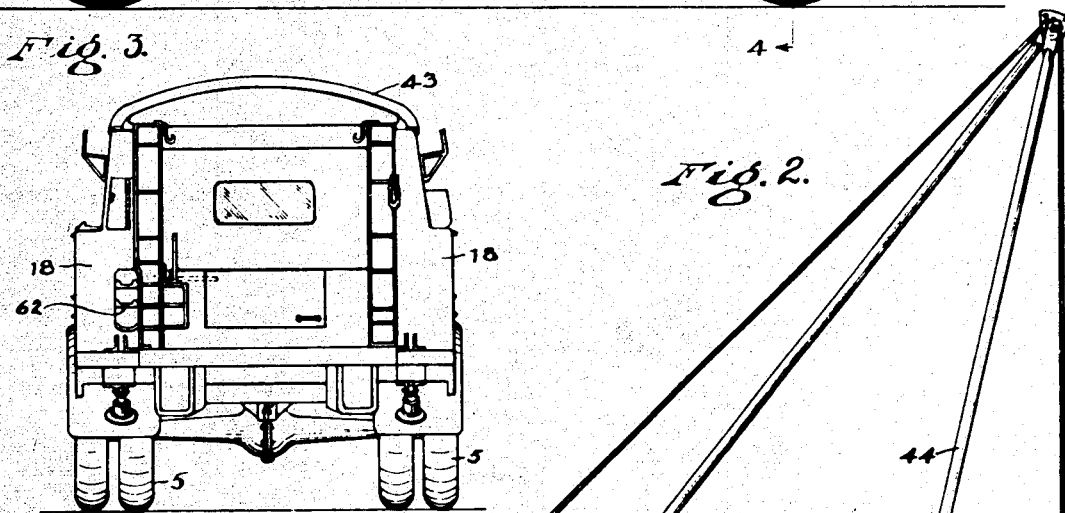
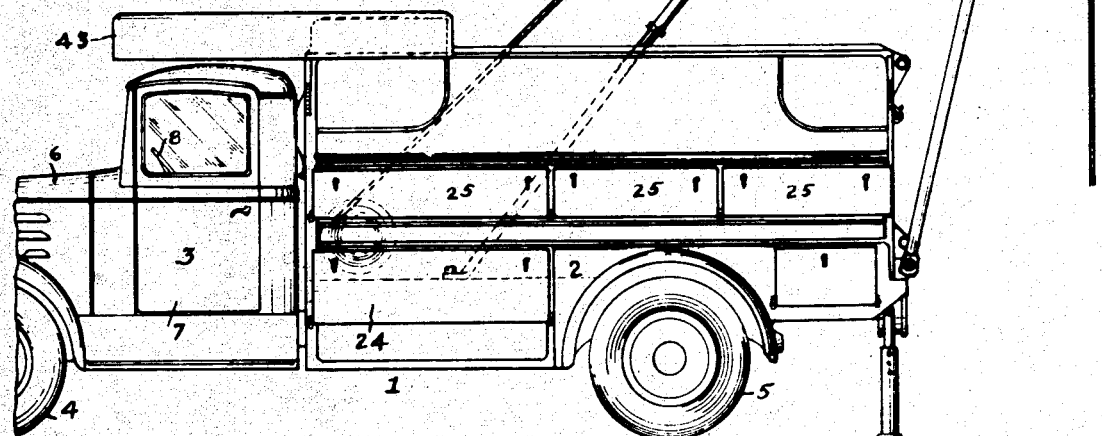
INVENTOR.
PAUL E. HAWKINS.
BY
ATTORNEY.

May 23, 1939. P. E. HAWKINS 2,159,022
UTILITY TRUCK
Filed Jan. 19, 1935 5 Sheets-Sheet 2
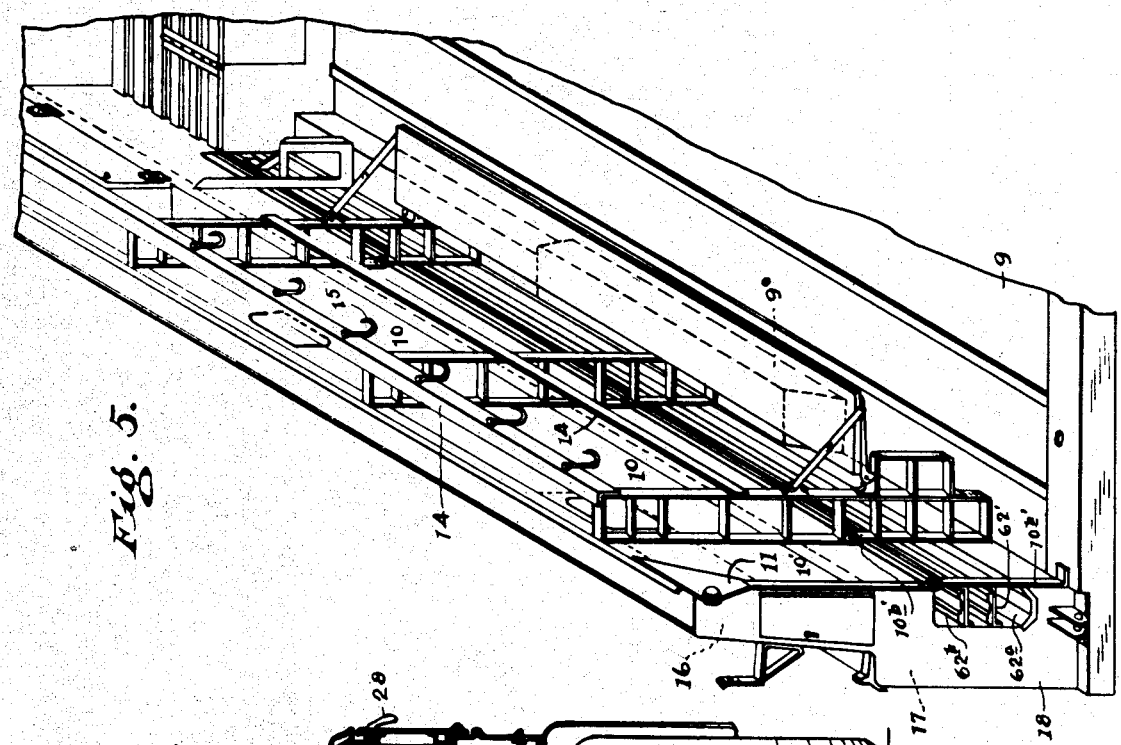
INVENTOR.
PAUL E. HAWKINS.
BY
Geo. A. Pitts
ATTORNEY.

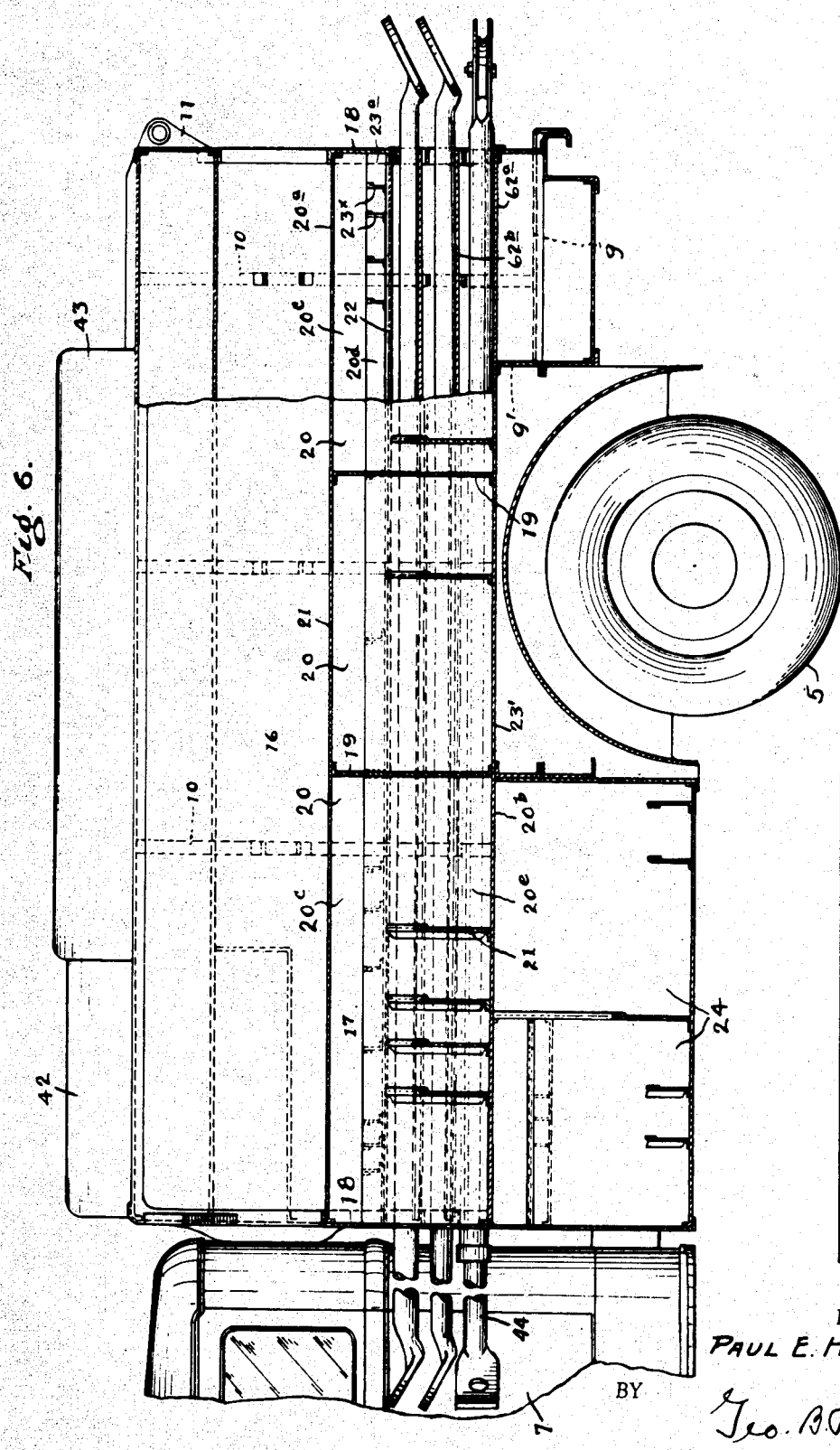

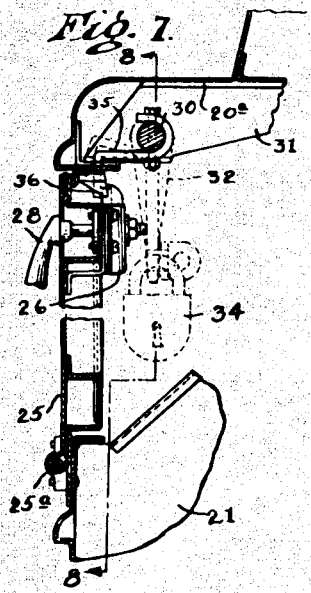
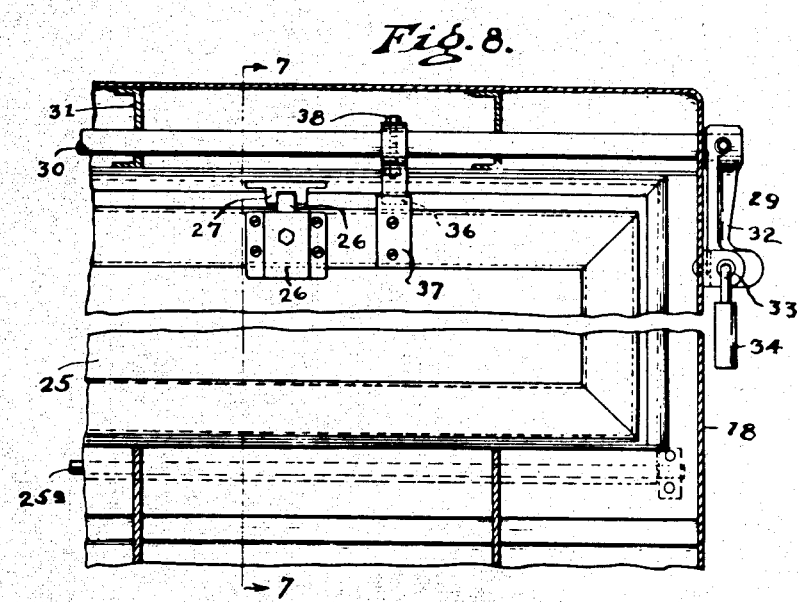
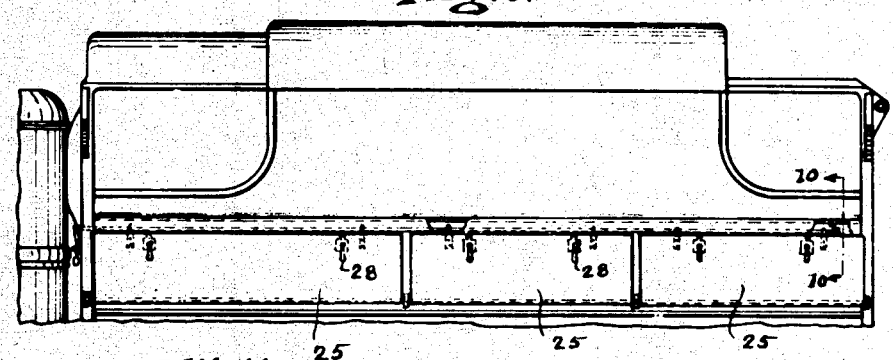
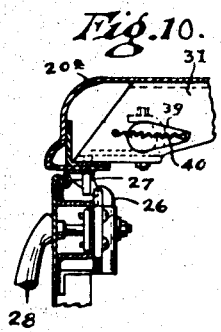
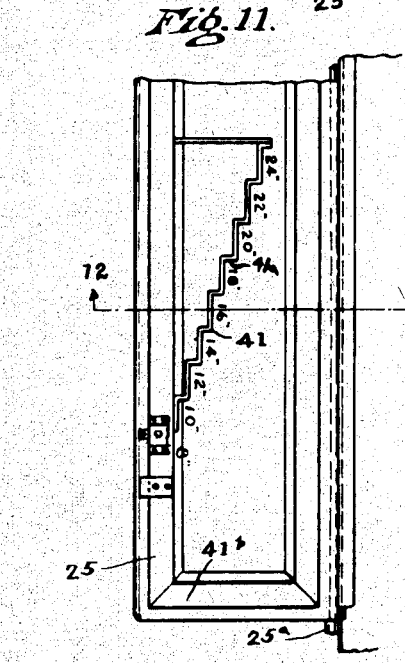
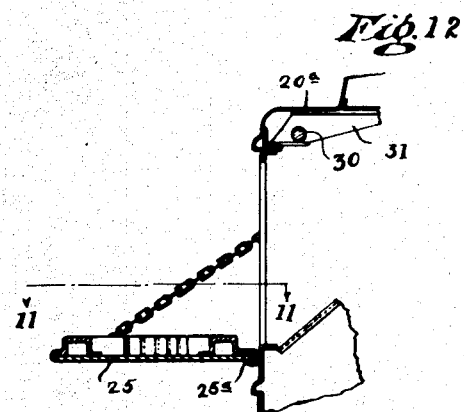
INVENTOR.
PAUL E. HAWKINS.
BY Geo. B Pitts
ATTORNEY.

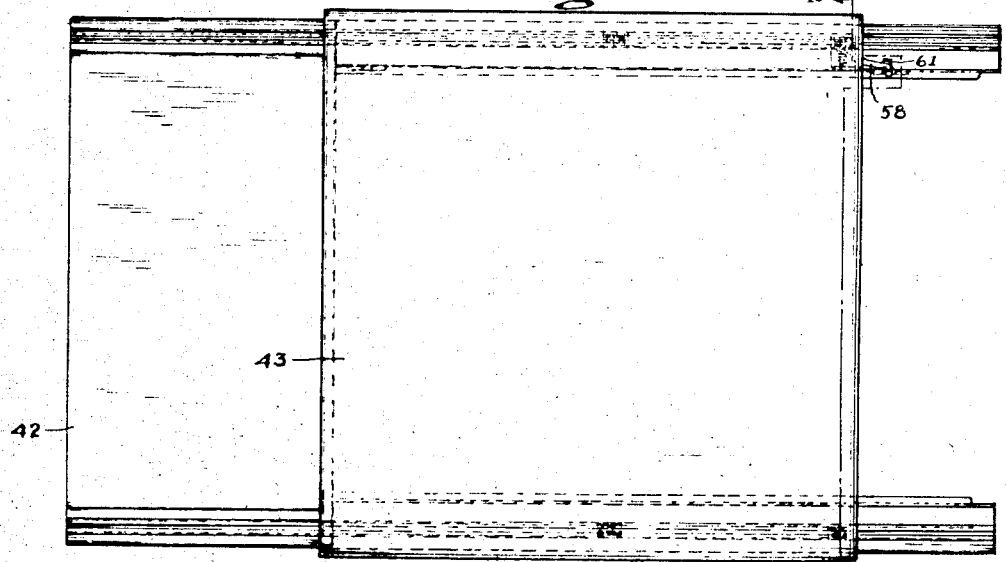
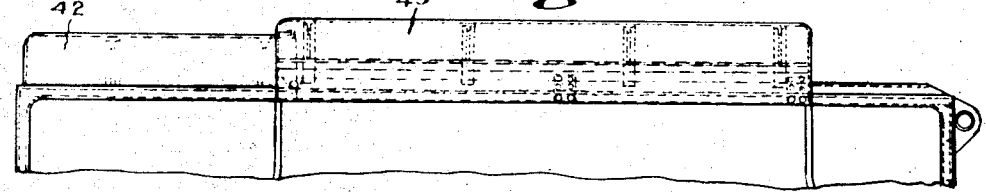
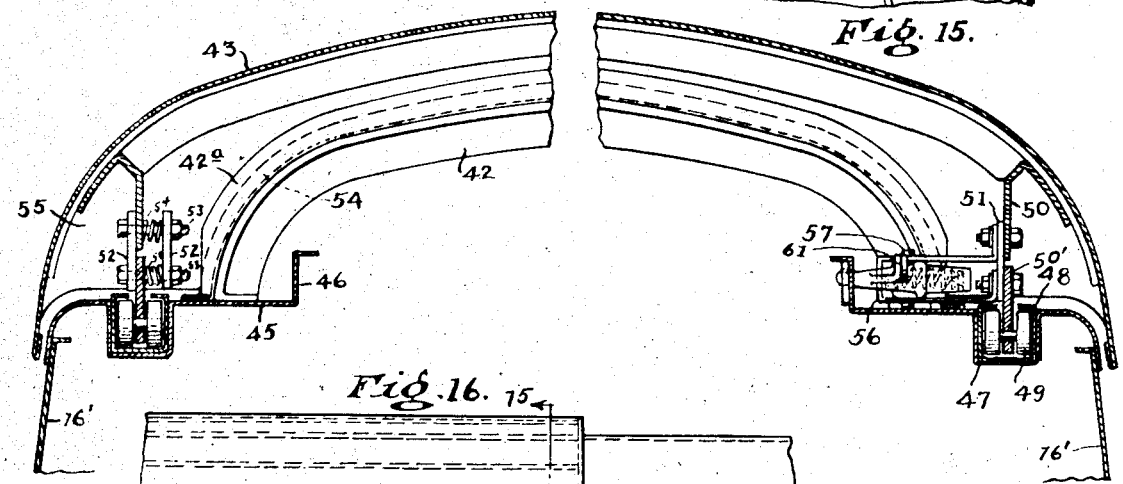
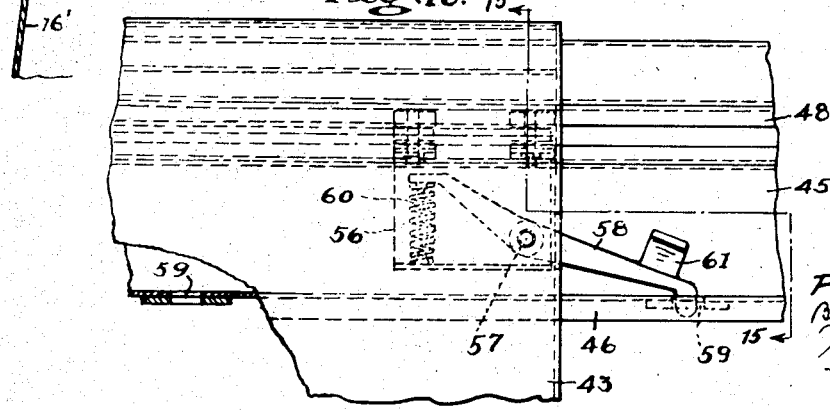

Patented May 23, 1939

2,159,022

UNITED STATES PATENT OFFICE 2,159,022

UTILITY TRUCK

Paul E. Hawkins, Lakewood, Ohio, assignor to The Baker-Raulang Company, Cleveland, Ohio, a corporation of Ohio Application January 19, 1935, Serial No. 2,554

3 Claims. (Cl. 296—137)

This invention relates to a power driven truck of the utility type particularly adapted for use by electricians and linemen in removing, resetting and installing poles for telephone and telegraph wires and current conductors, putting up and repairing overhead and underground conductors and wiring and other operations.

One object of the invention is to provide an improved truck of this type capable of carrying a large variety of tools and equipment in an arrangement which facilitates access thereto and economizes in space to increase the carrying capacity of the truck.

Another object of the invention is to construct an improved truck of this type in which provision is made to support the longer and heavier elements of certain equipment at a low elevation to lower the center of gravity during transportation and to facilitate loading and removing of these elements.

Another object of the invention is to construct an improved truck of this type in which is provided space for relatively long elements of equipment separate from the spaces or compartments for tools and repair materials and parts, without impairing (a) the driver's vision; (b) the loading and unloading of tools, materials and parts; and (c) ready access to other storage spaces.

Another object of the invention is to construct a truck of this type in which provision is made to support relatively long and heavy elements of certain equipment on the rigid supporting members of the truck frame, so that the exterior frame work may be made of light material in skeleton form, and provided with sheet metal walls to form a plurality of compartments.

Another object of the invention is to provide in a truck of this type having a plurality of compartments, improved means for simultaneously locking or unlocking the compartments.

A further object of the invention is to provide in a truck of this type having a compartment, an improved gage on one wall of the compartment, whereby certain equipment, for example devices stored in said compartment, may be checked before put into use.

A still further object of the invention is to provide an improved truck of this type having a roof portion mounted to slide endwise whereby certain equipment may be assembled and operated.

Other objects of the invention will be apparent to those skilled in the art to which my invention relates from the following description taken in connection with the accompanying drawings, wherein.

Fig. 1 is a side elevation of a truck embodying my invention.

Fig. 2 is a fragmentary view substantially as shown in Fig. 1, but showing the derrick in assembled position.

Fig. 3 is an elevation looking at the rear end of the truck, as shown in Fig. 1, the derrick poles being omitted.

Fig. 4 is a section on the line 4—4 of Fig. 1.

Fig. 5 is a fragmentary interior view of the truck, showing in perspective one side of the body.

Fig. 6 is a fragmentary section on the line 6—6 of Fig. 4, with parts broken away.

Fig. 7 is a fragmentary sectional view of the line 7—7 of Fig. 8.

Fig. 8 is a fragmentary section on the line 8—8 of Fig. 7.

Fig. 9 is a fragmentary side elevation of parts shown in Figs. 1 and 2, somewhat enlarged, with parts broken away.

Fig. 10 is a fragmentary section on the line 10—10 of Fig. 9.

Fig. 11 is a fragmentary plan view, on the line 11—11 of Fig. 12, showing the door for one of the compartments open.

Fig. 12 is a section on the line 12—12 of Fig. 11.

Fig. 13 is a top plan view.

Fig. 14 is a fragmentary side view of parts shown in Fig. 13, enlarged.

Fig. 15 is a section on the line 15—15 of Fig. 13.

Fig. 16 is a fragmentary plan view of parts shown in Figs. 13, 14 and 15, parts being broken away.

In the drawings, 1 indicates as an entirety the truck comprising a body 2 and driver's cab 3 preferably mounted on a chassis having front steerable wheels 4 and rear driven wheels 5, but if desired the truck may consist of a tractor and detachable trailer. In the arrangement chosen for illustration, the power means is below and within the hood 6 and such means is drivingly connected to the wheels 5 in a well known manner. The cab 3 is preferably of the closed type and provided with doors 7 (only one being shown) and houses a suitable seat opposite a steering wheel 8. The doors 7 are provided with suitable windows which may be movably mounted in the door or removable therefrom.

The body 2 comprises a flooring 9 on which are mounted at either side thereof inwardly of its side edges a plurality of upright frame members 10, 10', spaced longitudinally of the flooring.

At either side, the flooring is provided with inverted boxes 9' to cover the wheels 5. Each member 10 consists of a bottom section 10a, spaced side sections 10b, a top section 10c and cross bars 10d each alined with a cross bar on the adjacent frame member 10 and arranged to support various tools and materials or equipment to be transported and used. The cross bars are spaced non-uniformly from top to bottom of each member 10 to provide spaces of different sizes to receive various kinds of tools, materials and equipment. The frame members 10' are mounted near the rear end of the flooring 9 and each is connected at its upper end to a plate 11, which in turn is connected to a bar 12x extending longitudinally of the body and connected to the outer side sections of the frame members 10. The members 10' and outer side sections 10b of the members 10 are off-set inwardly, as shown at 10b' for a purpose later set forth.

The frame members 10 are connected or braced by one or more bars 14, two such bars being shown, the upper one being provided with hooks 15. I provide on the outer sides of each set of upright frame members 10, 10' and extending from end to end of the body 2 upper and lower storing chambers 16, 17, having end walls 18. The upper chambers 16 preferably open into the interior of the body 2. Each chamber 17 is divided by transverse partitions 19 into storing spaces 20 and by preference each space 20 is sub-divided by walls 21 into pockets.

Each storing space 20 is formed by a top wall 21 connected along its front edge to the outer wall 16' for the chamber 16, an upper rear wall 21' fixed to the uprights 10, a horizontal wall or ledge 22 extending outwardly from the lower end of the wall 21', a lower rear wall 23 depending from the front edge of the wall 22 and a bottom wall 23'. These walls are formed of sheet metal and may be made in one piece or in sections, two sections being shown for illustrative purposes. The ledge 22 is disposed above the off-sets 10b' for a reason which will later appear. Each ledge 22 may support a tray 23a having division walls 23x. The body 2 may also be provided with supplemental storing chambers 24 below the spaces 20, as shown in Figs. 1, 2 and 6.

The spaces 20 are open exteriorly of the body 2 and closed by doors 25, which are preferably hinged at 25a (see Figs. 7, 8, 9, 11 and 12).

Each door 25 is provided with a spring operated latch 26, normally engaging a keeper 27 on the upper wall of the adjacent space 20. Two such latch means are shown for each door. Each latch 26 is operatively connected to a suitable handle 28 mounted on the door, whereby the adjacent latch 26 may be retracted.

29 indicates as an entirety a locking means common to the doors 25 whereby all of them may be simultaneously locked or released for operation. Of the locking means 29, 30 indicates a rock shaft having bearing in the end walls 18 and intermediate hangers 31 fixed to the top walls 21. The shaft 30 extends through the inner end wall 18 and carries on its inner free end an arm 32 formed with an opening adapted to register with an opening formed in a lug 33 fixed to the end wall 18, whereby, by means of a padlock 34, the arm and lug may be secured together in locked relation. Intermediate its ends, the shaft 30 is provided with a plurality of spaced arms 35, two such arms being provided for each door 25. Each arm is provided at its free end with a depending lug 36 arranged to engage the outer side of a projecting keeper 37 fixed to the inner side of the door and lock the door in closed position, when the shaft 30 is rocked in one direction (counter-clockwise as shown in Fig. 7), thereby locking all of the doors in closed position simultaneously. By rocking the shaft in the opposite direction, all of the doors are simultaneously released for independent operation. Each arm 35 may consist of a section of strap iron having its inner end portion bent around a portion of the shaft 30 and secured thereto by a bolt 38. 39 indicates a link fixed to the shaft 30, preferably at its outer end. The free end of the link 39 is connected to one end of a coiled spring 40, the opposite end of which is fixed to the adjacent hanger 31 on the remote side of the shaft, the spring being normally under tension and so related to the axis of the shaft that the spring lies on one side of the axis when the shaft is rocked to lock the doors (see Fig. 10) and on the other side of the axis when the rod is rocked to release the doors (see dotted lines in Fig. 7); accordingly, the spring normally tends to hold the shaft in either position.

41 indicates a gage fixed to the inner side of one of the doors 25. The gage consists of a section of strap iron bent to form a series of steps the rear walls 41a of which are at predetermined distances from an abutment 41b, so that by engaging one end of a device (such as a bolt) with the abutment and its other end with one of the rear walls 41a, the length of the device may be determined. The door 25 is preferably reinforced by a rectangular frame 25b that is U-shaped in cross section. One inner side wall of this frame forms a suitable support for the gage 41 and one inner end wall of the frame may serve as the abutment 41b.

The top for the body 2 is of sectional construction having a front stationary roof section 42 and an endwise slidable roof section 43, which, when in its rearward position, as shown in Fig. 1, together with the top section 42, covers substantially the entire body 2. The top section 43 is slidable forwardly to the position shown in Fig. 2, to provide standing room and to permit the erection of a derrick, indicated as an entirety at 44. The outer walls 16' for the chambers 16 extend upwardly and are connected to longitudinally extending top sills 45, the inner edge portions of which terminate in angles 46, which are suitably secured to the frame uprights 10 (see Fig. 4). The stationary top section 42 is suitably secured to the sills 45, as shown in Fig. 15. In planes laterally outwardly of the side walls of the stationary top section 42, the sills 45 are shaped to form parallel channels 47 in which are fitted hollow guides 48 for sets of rollers 49. The upper walls of the guides 48 are formed with longitudinally extending slots through which extend plates 50 secured to and depending from the slidable top section 43. As shown in Fig. 15, the plates 50 which constitutes legs or hangers depending from the movable roof section 43, carry the shafts for the rollers 49 disposed on the shaft ends at opposite sides of the plates. The rollers 49 engage the top walls of the guides and thus support the top section 43 when it is moved forward to the Fig. 2 position. Each supporting, roller-carrying leg is preferably of sectional character, comprising a hanger portion 50 depending from the roof section and a longitudinal plate 50' that carries the runners that move in the guides or channels 47, those on one side being rigidly connected by plates 51 each rigidly bolted to the adjacent leg sections. On the other side of the top section 43 the sections of each leg are connected by a pair of plates 52 mounted on bolts 53, coiled springs 54 being provided on the bolts between one plate of the pair and the sections of the adjacent leg. In this arrangement, the springs 54 permit slight yielding movement between the top section and walls of the body so that any lateral movement imparted to the top section 43 during driving of the truck does not impose undue stresses on the walls of the body. The rear end of the top section 42 is flanged at 42a to form a support for a rubber strip 54 and the front end of the top section 43 is provided with a depending wall 55 which engages the rubber strip to close the top when the section is moved to its rearmost position.

The top section 43 may be locked in its rearmost position or in any adjusted position; for this purpose I mount on the rigidly connected sections of one supporting leg or hanger a yoke 56 which supports the opposite ends of a shaft 57. 58 indicates a lever mounted on the shaft 57, one end of the lever being arranged to project into any one of a series of openings 59 formed in the adjacent angle 46 and to thereby lock the top section 43 against sliding movement, a spring 60 being interposed between the opposite end of the lever 58 and one wall of the yoke 56 and operating to normally maintain the lever in locked relation to the angle 46. The lever 58 is preferably provided with a finger 61 which permits it to be readily disengaged from the angle 46.

Since the practical location of the stationary section of the roof is at the forward end of the truck immediately in rear of the cab 3, and the movable roof section, in passing from its normal position serving as a cover for the middle and rear portions of the body, as represented in Fig. 1, to its advanced position shown in Fig. 2, is carried beyond the stationary section so it overhangs the cab, it is found necessary to locate the channels which constitute the tracks in which run the supports for the movable roof section, outside the stationary section, that is laterally to the sides thereof, and that such tracks should be of a length approximating that of the complete roof with the two parts thereof in normal position.

The movable roof section is shell-shaped and its side edges overhang the forward stationary section. In the spaces below these overhanging portions of the movable roof section are located the supports for the movable section which carry the running parts that travel in the grooves or channels 47 of the side top plates. These grooves are formed in depending portions of the top plates so that the overhanging flanges 48 which serve to confine the runners are little if any above the main horizontal portions of the top plates 45. By forming the movable roof section with the overhanging edge portions there is provided ample covered space for the location and mounting of the yieldable elements, such as parts 52, 53 and 54, which may be associated with the sliding or rolling supports for the roof, and also for the locking features, such as the lever 58, that may be employed to secure the roof section in various positions to which it may be adjusted.

This utilization of the space below the overhanging edge portions of the movable roof section is further made available by making the carriers for the running supports of separable longitudinal plates such as 50' which may be easily secured to and removed from the depending hangers or feet 50.

62 indicates sets of supporting devices or elements, each set projecting laterally from the off-set portion 10b' of one of the frame uprights 10, 10'. Each set 62 comprises three horizontally disposed devices each suitably secured to and between the off-set of the adjacent upright and the rear wall 23 of the adjacent spaces 20 and extending horizontally from end to end of the body to support one of the derrick poles. The lower device consists of a continuous trough shaped member 62a and each upper device consists of a pair of longitudinally extending spaced rails 62b supported on transversely arranged arms 62' suitably secured at their opposite ends to the off-sets 20b' and the rear walls 23. The walls of the member 62 and rails 62b form seats for the derrick poles as shown in Fig. 6 and a guide means therefor when the poles are inserted or removed. In this arrangement each pole is supported independently of the remaining poles and therefore may be slid endwise into and out of its seat without danger of engaging the other poles. As will be understood from Figs. 3, 5 and 6, the end walls 18 are formed with openings 18' so that if the derrick or other poles are longer than the body 2, their ends are free to extend beyond the body ends, as shown in Figs. 1 and 6. Furthermore, in this arrangement, as is obvious from Figs. 1 and 6, the poles when supported in their seats are below the line of vision of the truck driver. It will also be noted that the sets of supporting devices are secured directly to the frame uprights and adjacent their lower ends. This arrangement provides for the carrying of the poles at a low position and makes it possible to construct the exterior walls of the body, in which the chambers and storing spaces are incorporated, of light material. By off-setting the outer side sections of the uprights 10, 10', a portion of the space between the side sections of the uprights 10 is utilized and the depth of the storing spaces 20 is increased.

To those skilled in the art to which my invention relates, many changes in construction and widely differing embodiments and applications of the invention will suggest themselves without departing from the spirit and scope of the invention. My disclosures and the description herein are purely illustrative and not intended to be in any sense limiting.

What I claim is:

1. In a truck of the class described having a body provided with a flooring and side walls, sills mounted on said side walls, and a top comprising a stationary section mounted on said sills and a separate section having depending supporting members along its opposite sides movably engaging said sills to permit the sliding of said separate section therealong, each member on one side of said separate section comprising yieldably connected elements.

2. A utility truck of the class described having a body provided with side members, a roof formed of two parts—a front section and a rearward slidable section of shell-like formation adapted to be moved forwardly over the stationary section, the side edge portions of the slidable section overhanging the side edges of the stationary portion,—running supports for the slidable roof section located in the spaces below the overhanging edge portions of such section, the running supports for one side of the slidable roof section being yieldable, and channels formed in the top walls of said side members of the body and located laterally outside the side edges of the forward section of the roof and extending substantially from end to end of the said side members and arranged to guide the said running supports for the slidable roof section for directing and holding the same in its movements.

3. A truck such as described in claim 2 in which the supports for the slidable roof section consist of hangers depending from the said roof section in the spaces below the overhanging side edges thereof, and plates detachably connected with said depending hangers carrying the running parts that engage with the guiding channels at the tops of the sides of the truck.

PAUL E. HAWKINS.